(12) United States Patent
Prakash et al.

(10) Patent No.: US 9,514,448 B2
(45) Date of Patent: Dec. 6, 2016

(54) COMPREHENSIVE TASK MANAGEMENT

(71) Applicant: Intel Corporation, Santa Clara, CA (US)

(72) Inventors: Gyan Prakash, Beaverton, OR (US); Nagasubramanian Gurumoorthly, Portland, OR (US); Saurabh Dadu, Tigard, OR (US); Venkatesh Ramamurthy, Hillsboro, OR (US); Rama Sawhney, Evanston, IL (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 13/729,595

(22) Filed: Dec. 28, 2012

(65) Prior Publication Data
US 2014/0189017 A1  Jul. 3, 2014

(51) Int. Cl.
| H04L 12/58 | (2006.01) |
| --- | --- |
| G06Q 10/10 | (2012.01) |
| G06Q 99/00 | (2006.01) |
| G06F 3/01 | (2006.01) |
| G01C 21/00 | (2006.01) |

(52) U.S. Cl.
CPC ............. *G06Q 10/109* (2013.01); *G01C 21/00* (2013.01); *G06F 3/01* (2013.01); *G06Q 99/00* (2013.01); *H04L 51/12* (2013.01)

(58) Field of Classification Search
CPC combination set(s) only.
See application file for complete search history.

(56) References Cited

U.S. PATENT DOCUMENTS

| 6,278,996 B1 | 8/2001 | Richardson et al. | |
| --- | --- | --- | --- |
| 7,024,369 B1* | 4/2006 | Brown et al. | 705/2 |
| 7,958,196 B2 | 6/2011 | Malone et al. | |
| 8,260,913 B2 | 9/2012 | Knapp et al. | |
| 2003/0084066 A1 | 5/2003 | Waterman et al. | |
| 2005/0192992 A1 | 9/2005 | Reed et al. | |
| 2006/0225076 A1* | 10/2006 | Longobardi | 718/102 |
| 2008/0079566 A1* | 4/2008 | Singh et al. | 340/539.13 |
| 2010/0036918 A1 | 2/2010 | Gupta | |
| 2010/0251169 A1* | 9/2010 | Kimchi | G06F 17/30861 715/808 |
| 2010/0332481 A1 | 12/2010 | Rowney | |
| 2011/0093619 A1* | 4/2011 | Nelson | G06Q 10/06 709/248 |
| 2011/0145823 A1* | 6/2011 | Rowe et al. | 718/100 |
| 2013/0005405 A1* | 1/2013 | Prociw | 455/566 |
| 2013/0346981 A1* | 12/2013 | Johnson et al. | 718/100 |

FOREIGN PATENT DOCUMENTS

| CN | 1577279 A | 2/2005 |
| --- | --- | --- |
| WO | WO02091216 A1 | 11/2002 |
| WO | WO2012/092654 A1 | 7/2012 |

OTHER PUBLICATIONS

Wikipedia, "Springpad," retrieved from <http://en.wikipedia.org/w/index.php?title=Springpad&oldid=508767441">, last modified Aug. 23, 2012, 3 pages.

(Continued)

*Primary Examiner* — Chris Parry
*Assistant Examiner* — Caroline Jahnige
(74) *Attorney, Agent, or Firm* — Barnes & Thornburg LLP

(57) ABSTRACT

Technologies for generating tasks from communication messages includes a mobile computing device for monitoring communication messages, parsing the communication messages to detect content indicative of upcoming tasks, generating a task for each of the upcoming tasks detected, generating a task list from the generated tasks, and generating an alarm for each task. Additionally, the mobile computing device receives tasks generated by a cloud server.

29 Claims, 8 Drawing Sheets

(56) References Cited

OTHER PUBLICATIONS

Wikipedia, "Remember the Milk," retrieved from <http://en.wikipedia.org/w/index.php?title=Remember_the_Milk&oldid=536442086>, last modified Feb. 4, 2013, 2 page.
Todoroo, Inc., "Astrid," retrieved from <http://astrid.com/>, last accessed Feb. 4, 2013, 3 pages.
Toodledo, "Toodledo," retrieved from <http://www.toodledo.com/>, last accessed Feb. 4, 2013, 1 page.
Any.Do, "Any.DO—make things happen," retrieved from <http://www.any.do/>, last accessed Feb. 4, 2013, 2 pages.
International Search Report and Written Opinion received for International Application No. PCT/US2013/077576, mailed Apr. 8, 2014, 11 pages.
European Search Report for Application No./Patent No. 13866777.9-1955/2939135, dated Jul. 7, 2016, 8 pages.
Chinese Office Action for Patent Application No. 201380062078.X, dated Aug. 16, 2016, 17 pages.

\* cited by examiner

COMPREHENSIVE TASK MANAGEMENT

BACKGROUND

Mobile computing devices are becoming ubiquitous tools for personal, business, and social uses. The portability of mobile computing devices is increasing as the size of the devices decrease and processing power increases. In fact, many computing devices are sized to be hand-held by the user to improve ease of use. Additionally, modern mobile computing devices are equipped with increased processing power and data storage capability to allow such devices to perform advanced processing. Further, many modern mobile computing devices are capable of connecting to various data networks, including the Internet, to retrieve and receive data communications over such networks. As such, modern mobile computing devices are powerful, often personal, tools untethered to a particular location.

People today often struggle to achieve a work-life balance due to an increasing number of demands being placed on their time and availability. As a result, many people organize their day using some form of a paper-based task management solution (e.g., paper-based to-do lists, calendars, agendas, planners, etc.) in order to achieve their goals. Additionally, due to the increased portability, functionality, and ease of use of modern mobile computing devices, some people have turned to electronic calendars and other task management features being offered on those devices. However, similar to their counterpart paper-based solutions, electronic task management features often require users to manually enter or reschedule new or upcoming tasks and events. As such, conventional electronic task management features lack the ability to automatically enter or reschedule new or upcoming tasks without intensive interaction by the user.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
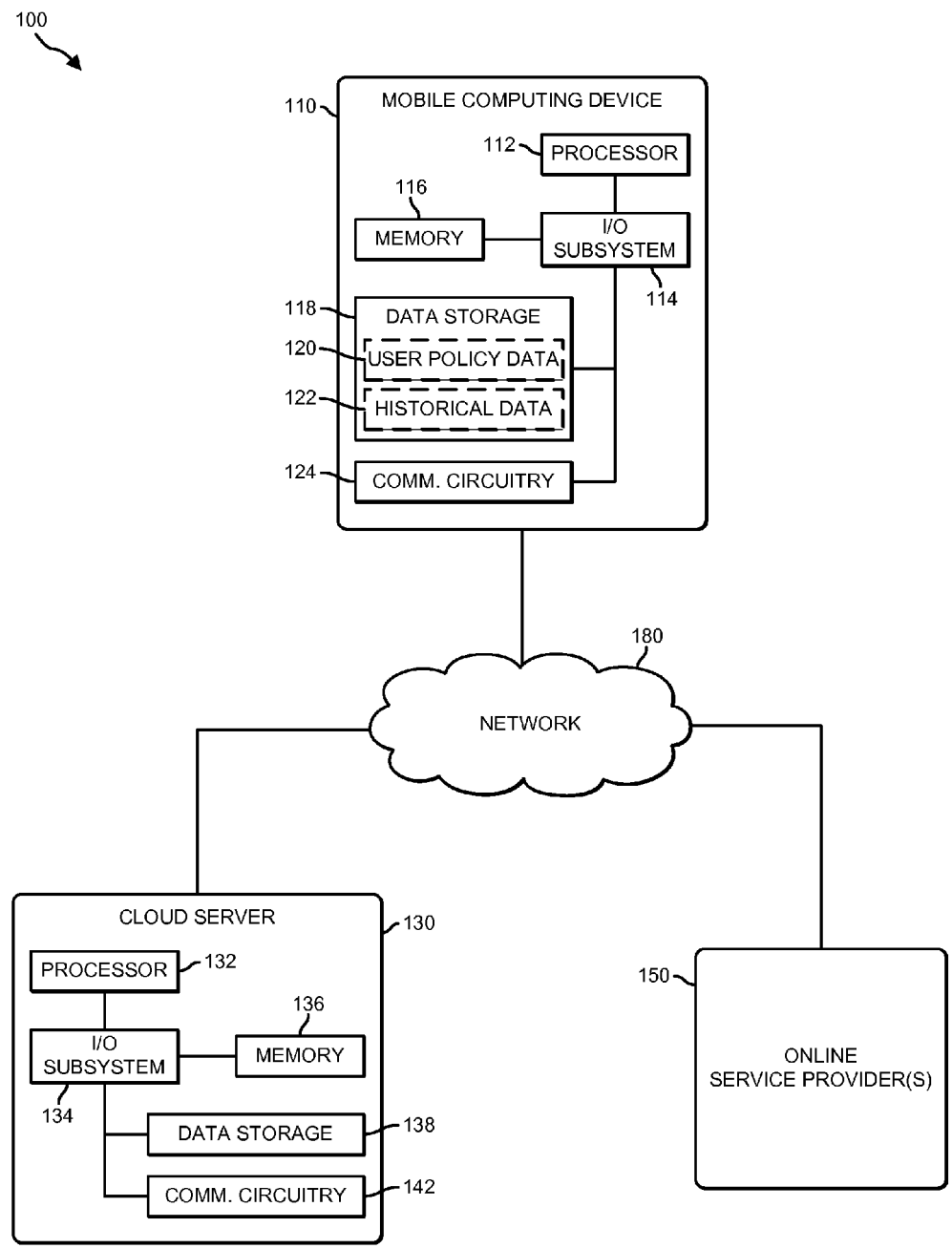
FIG. 1 is a simplified block diagram of at least one embodiment of a system for comprehensive task management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for comprehensive task management includes a mobile computing device 110, a cloud server 130, one or more online service providers 150, and a network 180. In use, the mobile computing device 110 may monitor the communication activities of a user on the mobile computing device 110 and generate or update a to-do list, managed on the mobile computing device 110, based on such communication activities. For example, in some embodiments, the mobile computing device 110 may monitor communication messages corresponding to the user's e-mail messaging activities, device messaging activities (e.g., text messages, chats, etc.), social networking activities (e.g., comments, chats, posts, messages, etc.), device voice command activities, and/or any other type of communication activity by the user of the mobile computing device 110. In doing so, the mobile computing device 110 may analyze the communication messages to determine whether any messages include content indicative of an upcoming task for the user to complete and/or an upcoming event for the user to attend. For each communication message determined to include such content, the mobile computing device 110 may generate a corresponding task. In some embodiments, each of the tasks generated by the mobile computing device 110 may be aggregated to generate a global to-do list (e.g., a global task list) for the user.

In some embodiments, the global to-do list generated by the mobile computing device 110 may include tasks generated, or otherwise determined, by the cloud server 130. In such embodiments, the cloud server 130 may also monitor the online activities of the user. For example, the cloud server 130 may monitor, in some embodiments, online communication messages and/or electronic data corresponding to the user (e.g., online transactions, online purchases, electronic billing statements, electronic bill payment, account balances, cloud-based e-mail services, social networking activities, etc.), which may be provided by or otherwise retrieved from one or more of the online service providers 150. In doing so, the cloud server 130 may analyze the online communication messages to determine whether any messages include content indicative of an upcoming task for the user to complete and/or an upcoming event for the user to attend. For each online communication message determined to include such content, the cloud server 130 may generate a corresponding task, which as discussed in more detail below, may be synchronized with the mobile computing device 110 and included in the global to-do list. In that way, the mobile computing device 110 may generate a comprehensive to-do list of tasks using information obtained from a variety of different sources.

In some embodiments, the mobile computing device 110 may also monitor the user's interaction and/or response to the generated tasks based at least in part on, or otherwise as a function of, the context of the mobile computing device 110. For example, the mobile computing device 110 may monitor which tasks the user acknowledges, ignores, postpones, and/or reprioritizes based on the determined location (e.g., work, home, school, recreational places, city, state, country, etc.) and/or the context of the mobile computing device 110. In doing so, the mobile computing device 110 may determine whether to modify the upcoming tasks and/or update the order of tasks on the to-do list in response to detecting a change in the context of the mobile computing device 110.

The mobile computing device 110 may also determine, in some embodiments, whether a modification to an upcoming task or an update to the order of tasks on the to-do list is permitted based at least in part on, or otherwise as a function of, one or more user policies. For example, based on one or more user policies, the mobile computing device 110 may determine that a particular task modification and/or an update to the order of tasks on a to-do list is related to or may otherwise impact the user's health or finances. In such embodiments, the mobile computing device 110 may not prevent the task to be modified and/or the order of to-do list to be updated.

The mobile computing device 110 may be embodied as any type of computing device capable of performing the functions described herein including, but not limited to, a mobile phone, a smart phone, a tablet computing device, a personal digital assistant, a messaging device, a consumer electronic device, a handset, and/or any other type of computing device. As shown in FIG. 1, the illustrative mobile computing device 110 includes a processor 112, a memory 116, an input/output (I/O) subsystem 114, a data storage 118, and communication circuitry 124. Of course, the mobile computing device 110 may include other or additional components, such as those commonly found in a computing device (e.g., various input/output devices), in other embodiments. Additionally, in some embodiments, one or more of the illustrative components may be incorporated in, or otherwise from a portion of, another component. For example, the memory 116, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the mobile computing device 110 such as operating systems, applications, programs, libraries, and drivers. The memory 116 is communicatively coupled to the processor 112 via the I/O subsystem 114, which may be embodied as circuitry and/or components to facilitate input/output operations with the processor 112, the memory 116, and other components of the mobile computing device 110. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the mobile computing device 110, on a single integrated circuit chip.

The communication circuitry 124 of the mobile computing device 110 may be embodied as any communication circuit, device, or collection thereof, capable of enabling communications between the mobile computing device 110 and one or more of the cloud server 130, the one or more online service providers 150, and/or the other computing devices. The communication circuitry 124 may be configured to use any one or more communication technology (e.g., wireless or wired communications) and associated protocols (e.g., Ethernet, Wi-Fi®, WiMAX, etc.) to effect such communication.

In some embodiments, the mobile computing device 110 communicates with one or more of the cloud server 130, the one or more online service providers 150, and/or other computing devices over a network 180. The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. As such, it should be appreciated that the network 180 may also include any number of additional devices to facilitate communication between the mobile computing device 110 and one or more of the cloud server 130, the one or more online service providers 150, and/or the other computing devices.

The data storage 118 may be embodied as any type of device or devices configured for short-term or long-term storage of data such as, for example, memory devices and circuits, memory cards, hard disk drives, solid-state drives, or other data storage devices. In some embodiments, the data storage 118 may be configured to store user policy data 120. As discussed in more detail below, the user policy data 120 may include one or more policies and/or rules corresponding to tasks that may have health and/or financial implications for the user. Additionally, in some embodiments, the data storage 118 may also be configured to store historical data 122, which as discussed in more detail below, may be indicative of a user's past interactions with the mobile computing device 110 in different locations and/or contexts.

The cloud server 130 may be embodied as any type of computing device server capable of performing the functions described herein. The illustrative cloud server 130 includes a processor 132, a memory 136, an I/O subsystem 134, a data storage 138, and communication circuitry 142. Those components of the cloud server 130 may be similar to the corresponding components of the mobile computing device 110, the description of which is applicable to the corresponding components of the cloud server 130 and is not repeated herein for clarity of the description. As discussed in more detail below, the cloud server 130 may be configured to communicate with the mobile computing device 110 over the network 180. In some embodiments, the cloud server 130 may also be configured to communicate with the one or more online service providers 150 to facilitate monitoring the user's online communication activities with the one or more online service providers 150. To do so, as discussed in more detail below, the cloud server 130 may be configured to request, from the one or more online service providers 150, online communication messages and/or electronic data corresponding to the user. Additionally or alternatively, in some embodiments, the cloud server 130 may be configured to function as a proxy between the mobile computing device 110 and the one or more online service providers 150. In such embodiments, the cloud server 130 may receive the online communication messages from the mobile computing device 110 and then forward those messages to the appropriate one or more online service providers 150.

The one or more online service providers 150 may be embodied as any type of online service provider that provides electronic services (e.g., social networking, online chatting, e-mail services, online transactions, online purchases, electronic billing statements, electronic bill payment, account balances, etc.) over a network to the user and/or a computing device of the user. As such, the online service providers may include devices and structures commonly found in online service providers, which are not shown in FIG. 1 for clarity of the description. In some embodiments, the one or more online service providers 150 may be configured to communicate with the mobile computing device 110 and the cloud server 130 over the network 180. Additionally, as discussed in more detail below, the one or more online service providers 150 may be configured to provide, over the network 180, online communication messages and/or electronic data corresponding to the user to the cloud server 130.

Figure 2:
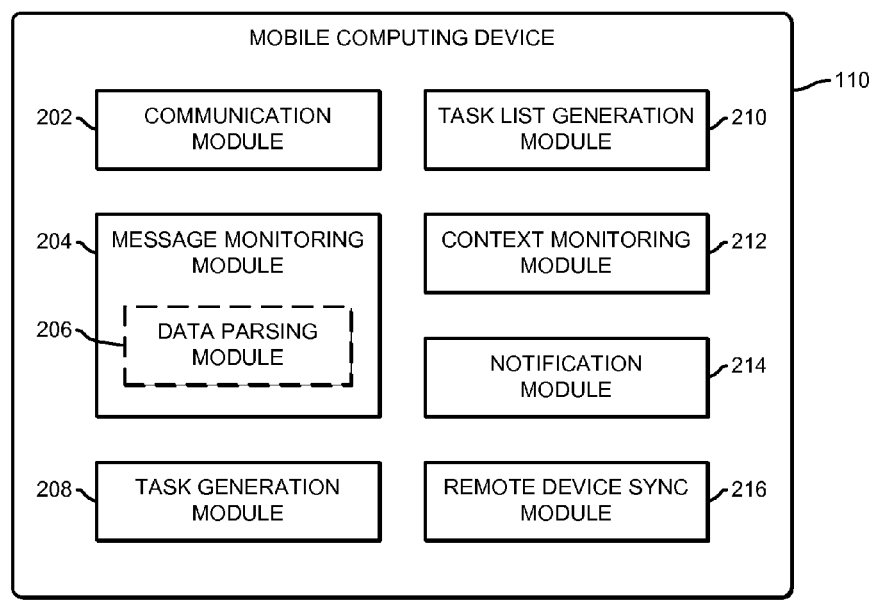
FIG. 2 is a simplified block diagram of at least one embodiment of an environment of the mobile computing device of the system of FIG. 1.

Referring now to FIG. 2, in one embodiment, the mobile computing device 110 establishes an environment 200 during operation. The illustrative environment 200 includes a communication module 202, a message monitoring module 204, a task generation module 208, a task list generation module 210, a context monitoring module 212, a notification module 214, and a remote device synchronization module 216, each of which may be embodied as software, firmware, hardware, or a combination thereof. It should be appreciated that the mobile computing device 110 may include different or additional components, sub-components, modules, and devices commonly found in a computing device, which are not illustrated in FIG. 2 for clarity of the description.

The communication module 202 facilitates communications between any component and/or sub-component of the mobile computing device 110 and one or more of the cloud server 130, the one or more online service providers 150, and/or other computing devices. For example, the communication module 202 may facilitate sending and receiving communication messages over the network 180 that correspond to the user's communication activities (e.g., text messaging, chatting, e-mail communications, social networking posts/updates, etc.) on the mobile computing device 110. Additionally, the communication module 202 may be configured to receive one or more tasks, which as discussed in more detail below, may be generated and sent over the network 180 by the cloud server 130.

The message monitoring module 204 may be configured in some embodiments to facilitate monitoring of the user's communication activities on the mobile computing device 110. For example, in some embodiments, the message monitoring module 204 may monitor communication messages corresponding to the user's e-mail messaging activities, device messaging activities (e.g., text messages, chats, etc.), social networking activities (e.g., comments, chats, posts, messages, etc.), device voice command activities, or any other type of communication activity by the user of the mobile computing device 110. In doing so, the message monitoring module 204 may analyze the communication messages to determine whether any messages include content indicative of an upcoming task for the user to complete and/or an upcoming event for the user to attend.

To facilitate analyzing the communication messages, the message monitoring module 204 may include, in some embodiments, a data parsing module 206. In such embodiments, the data parsing module 206 may be configured to parse the communication messages and determine whether any messages include content indicative of an upcoming task for the user to complete and/or an upcoming event for the user to attend. In some embodiments, the data parsing module 206 may be configured to detect whether particular reference phrases and/or reference keywords are included in the communication messages. For example, the data parsing module 206 may be configured to utilize a reference phrase and/or keyword to detect whether any of the monitored communication messages include content corresponding one or more of a date, a time, an activity or an event description, a location of an activity or an event, a user's commitment to perform an activity, or any other type of content indicative of the user's plans. Additionally or alternatively, in embodiments wherein the message monitoring module 204 monitors communication messages sent to and/or received from another person (e.g., e-mail messages, chat messages, text messages, social networking posts, etc.), the data parsing module 206 may be configured to parse the communication messages to determine whether any were sent by a particular sender and/or received by a particular a recipient. For example, in such embodiments, the data parsing module 206 may parse a communication message (e.g., an e-mail message) and determine that the communication message was sent by the user to a particular friend or a colleague. The data parsing module 206 may also parse communication messages to determine the message type in some embodiments. For example, the data parsing module 206 may parse communication messages for information indicative of whether a particular message is work-related or personal (e.g., social, finance, fitness, etc.) in nature.

The context monitoring module 212 may be configured to determine the context of the mobile computing device 110. For example, in some embodiments, the context monitoring module 212 may determine the location (e.g., work, home, school, recreational places, city, state, country, etc.) of the mobile computing device 110. To do so, the context monitoring module 212 may analyze context data (e.g., camera usage, device usage, device movement, lighting conditions, etc.) generated by one or more components of the mobile computing device 110. It should be appreciated that in some embodiments the mobile computing device 110 may also include location determining components such as, for example, global positioning system components. As discussed in more detail below, the location and context of the mobile computing device 110 may be utilized to facilitate notifying the user of one or more upcoming tasks and/or events.

The task generation module 208 may be configured, in some embodiments, to generate one or more tasks using the information obtained by the data parsing module 206, or more generally, the message monitoring module 204. To do so, the task generation module 208 may process or otherwise format each of the communication messages determined to include content indicative of an upcoming task and/or event into a corresponding task. In some embodiments, the task generated by the task generation module 208 may include a description of the task and/or event and a date/time that the task is to be completed and/or the event is to occur. It should be appreciated that in other embodiments, the task generated by the task generation module 208 may include any other type of information (e.g., a location, a reminder, notes, etc.) corresponding to the upcoming task and/or event.

The task list generation module 210 may be configured to generate a task list. To do so, the task list generation module 210 may arrange one or more of the generated tasks into a list. In some embodiments, the task list generation module 210 may arrange the generated tasks into a global task list, which as discussed in more detail below, may include tasks generated by the mobile computing device 110 as well as tasks generated by the cloud server 130. It should be appreciated that although the task list generation module 210 generates a single task list in the illustrative embodiment, the task list generation module 210 may generate more than one task list in other embodiments. For example, in embodiments wherein the data parsing module 206 determines a message type (e.g., work-related, personal, fitness-related, finance-related, etc.), the task list generation module 210 may generate a list for work-related tasks and another list for personal tasks.

In some embodiments, the task list generation module 210 may determine a priority for each of the generated tasks on the task list. In such embodiments, the task list generation module 210 may assign a priority to each task on the task list based at least in part on, or otherwise as a function of, the date/time that the task is to be completed and/or the event is to take place. For example, tasks and events that are to be completed and/or occur sooner than others may be assigned a higher priority by the task list generation module 210. It should be appreciated that although the task list generation module 210 determines and assigns a priority to each of the generated tasks based at least in part on the date/time that a task is to be completed in the illustrative embodiment, the task list generation module 210 may determine and assign task priority in any suitable manner. For example, as discussed, the data storage 118 may include user policy data 120 in some embodiments. Such user policy data 120 may include policies and/or rules corresponding to tasks that may have health and/or financial implications for the user. In such embodiments, the task list generation module 210 may assign tasks that affect the health and/or finances of the user a higher priority than those that do not. It should be appreciated that although the user policy data 120 of the illustrative embodiment includes policies and/or rules corresponding to tasks that may impact the user's health or finances, the user policy data 120 may include any number of policies and/or rules corresponding to tasks that may affect any aspect of the user's well-being.

Additionally, in some embodiments, the task list generation module 210 may determine that the context and/or location of the mobile computing device 110 has changed and, as a result, the user will no longer be able to complete a particular task. In such embodiments, the task list generation module 210 may determine whether to reprioritize, reschedule, and/or cancel the task on the task list. For example, in some embodiments, the task list generation module 210 may compare the current location of the mobile computing device 110 (as determined by the context monitoring module 212) with the historical data 122 stored in the data storage 118. Based on that comparison, the task list generation module 210 may determine that the mobile computing device 110 has changed locations and, as a result, the user is currently traveling. Since the user is in a new location, the task list generation module 210 may determine that the user will not longer be able to complete a task (e.g., swimming, attending a weekly lunch meeting, etc.) that was scheduled to be completed in the user's original location. As a result, the task list generation module 210 may reschedule, reprioritize, and/or cancel the task on the task list.

Additionally, to facilitate determining whether to reprioritize, reschedule, and/or cancel a particular task because of a location change, the task list generation module 210 may determine how the user responded to a substantially similar task in the past because of a location change. For example, the task list generation module 210 may determine whether, because of a location change, the user ignored, postponed, or reprioritized a similar task in the past. If, in the past, the user ignored, postponed, or reprioritized a similar task, the task list generation module 210 may determine to reprioritize, reschedule, and/or cancel a particular task because of the location change. If, however, the user did not ignore, postpone, cancel, or reprioritize a similar task, the task list generation module 210 may instead determine not to reprioritize, reschedule, ignore, and/or cancel the particular task because of the location change. To facilitate making such determinations, the task list generation module 210 may compare the user's current interactions with the mobile computing device 110 and the current context of the mobile computing device 110 with the historical data 122, which as discussed, may be stored in the data storage 118 of the mobile computing device 110. It should be appreciated that although the task list generation module 210 determines whether to reprioritize, reschedule, ignore, and/or cancel a particular task because of a location change in the illustrative embodiment, the task list generation module 210 in other embodiments may also determine that a particular task should be reprioritized, rescheduled, and/or canceled because of changes in the user's response pattern. In that way, the mobile computing device 110 may continually adjust to the user's behavior.

The notification module 214 may be configured to generate an alarm for each task on the global task list. For example, the notification module 214 may generate an alarm to alert the user of the mobile computing device 110 at the start of or prior to the occurrence of a task on the task list. To do so, the notification module 214 may be configured to provide the user with a notification (e.g., visual notification, audible notification, tactile feedback, etc.) via one or more components of the mobile computing device 110. In some embodiments, the notification module 214 may determine whether to generate an alarm for each task as a function of each task's priority in the task list. Additionally or alternatively, in some embodiments, the notification module 214 may determine whether to generate an alarm for each task as a function of the date/time that each task is to be completed and/or each event is to occur. As discussed, the notification module 214 may also generate, in some embodiments, one or more reminders prior to the occurrence of a task on the task list (e.g., a reminder alarm). In such embodiments, the generated reminder alarms may include one or more notifications (e.g., visual notification, audible notification, tactile feedback, etc.) configured to alert the user of the mobile computing device 110 prior to the occurrence of a task on the task list. Additionally, in some embodiments, the alarms and/or notifications generated by the notification module 214 may require user interaction and/or response. For example, the user may be required to utilize one or more inputs (e.g. a touch screen, a keyboard, a mouse, a user interface, a voice recognition interface, etc.) of the mobile computing device 110 to one or more of acknowledge, ignore, or postpone (e.g., "snooze") an alarm at the time of occurrence.

The notification module 214 may also disable or otherwise ignore an alarm previously generated for a task, in some embodiments. For example, the notification module 214 may disable an existing alarm for a particular task in response to the task list generation module 210 canceling that task. Additionally or alternatively, the notification module may modify an alarm previously set for a particular task. For example, the notification module 214 may modify an existing alarm for a particular task in response to the task list generation module 210 reprioritizing and/or rescheduling that task.

The remote device synchronization module 216 may be configured to synchronize one or more of the tasks and/or task lists generated by the task list generation module 210 with the cloud server 130. To do so, the remote device synchronization module 216 may send one or more of the tasks and/or task lists generated by the task list generation module 210 to the cloud server 130 for synchronization. Additionally or alternatively, in some embodiments, the remote device synchronization module 216 may be configured to receive one or more tasks generated by the cloud server 130. In such embodiments, the remote device synchronization module 216 may compare the tasks received from the cloud server 130 with those generated by the task list generation module 210. Based on that comparison, the remote device synchronization module 216 may discard duplicate tasks received from the cloud server 130 (e.g., tasks that have already been generated locally by the task list generation module 210). In such embodiments, the task list generation module 210 may be configured to add those non-duplicate tasks received from the cloud server 130 to the global task list. In that way, the remote device synchronization module 216 may facilitate the task list generation module 210 in generating a comprehensive to-do list of tasks using information obtained from a variety of different sources.

Figure 3:
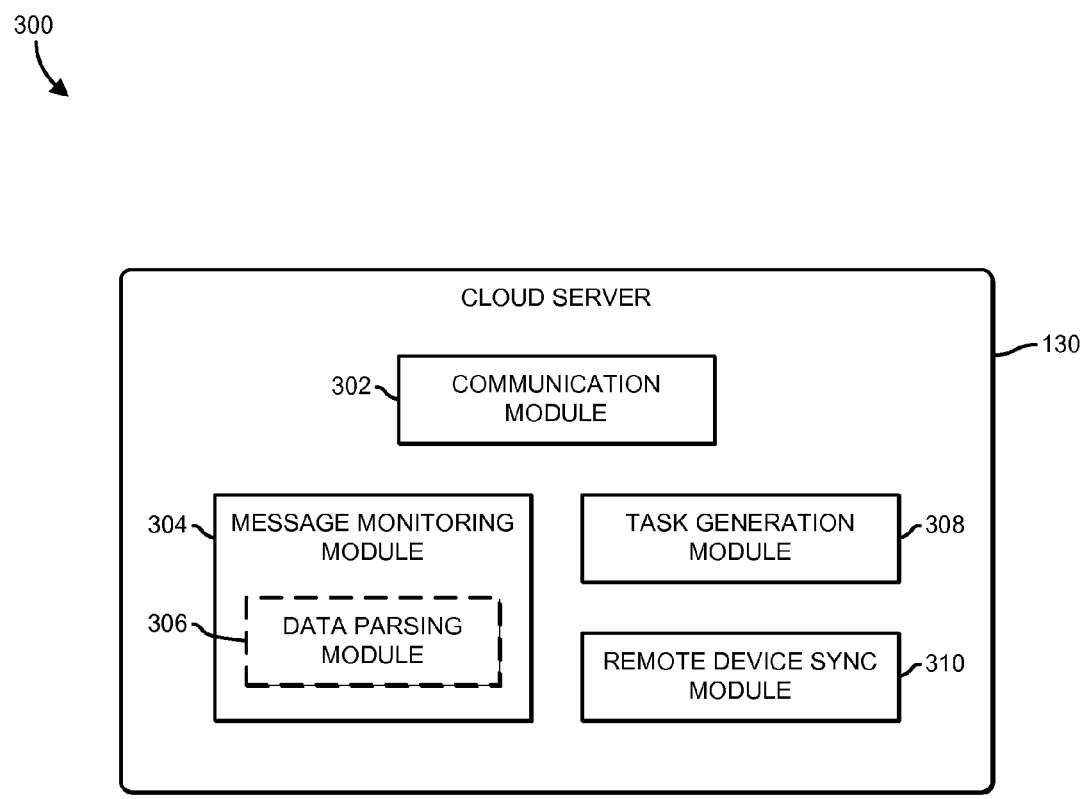
FIG. 3 is a simplified block diagram of at least one embodiment of an environment of the cloud server of the system of FIG. 1.

Referring now to FIG. 3, in one embodiment, the cloud server 130 establishes an environment 300 during operation. The illustrative environment 300 includes a communication module 302, a message monitoring module 304, a task generation module 308, and a remote device synchronization module 310, each of which may be embodied as software, firmware, hardware, or a combination thereof. It should be appreciated that the cloud server 130 may include other components, sub-components, modules, and devices commonly found in a computing device, which are not illustrated in FIG. 3 for clarity of the description.

The communication module 302 facilitates communications between any component and/or sub-component of the cloud server 130 and one or more of the mobile computing device 110, the one or more online service providers 150, and/or other computing devices. For example, the communication module 302 may facilitate sending and receiving communication messages over the network 180 that correspond to the user's online communication activities (e.g., text messaging, chatting, e-mail communications, social networking posts/updates, etc.). In some embodiments, the communication module 302 may facilitate receiving online communication messages and/or electronic data corresponding to the user from the one or more online service providers 150.

The message monitoring module 304 may be configured in some embodiments to facilitate monitoring the user's communication activities on the cloud server 130. For example, in some embodiments, the message monitoring module 304 may monitor communication messages corresponding to the user's e-mail messaging activities, device messaging activities (e.g., text messages, chats, etc.), social networking activities (e.g., comments, chats, posts, messages, etc.), or any other type of communication activity by the user via the cloud server 130. In doing so, the message monitoring module 304 may analyze the communication messages to determine whether any includes content indicative of an upcoming task for the user to complete and/or an upcoming event for the user to attend.

In some embodiments, the message monitoring module 304 may also monitor the user's online communication activities with the one or more online service providers 150. To do so, the message monitoring module 304 may be configured to monitor user communication messages and/or electronic data (e.g., online transactions, online purchases, electronic billing statements, electronic bill payment, account balances, cloud-based e-mail services, social networking activities, etc.) corresponding to the user, which as discussed, may be received from the one or more online service providers 150. In some embodiments, the message monitoring module 304 may actively monitor the user's online communication activities with the one or more online service providers 150. To do so, the message monitoring module 304 may be configured to request the user's communication messages and/or electronic data from the one or more online service providers 150. Additionally or alternatively, in embodiments wherein the cloud server 130 is configured to function as a proxy between the mobile computing device 110 and the one or more online service providers 150, the message monitoring module 304 may also passively monitor the user's online communication activities with the one or more online service providers 150. To do so, the message monitoring module 304 may be configured to monitor user communication messages received from the mobile computing device 110 and destined for one or more of the online service providers 150.

To facilitate analyzing the communication messages, the message monitoring module 304 may include, in some embodiments, a data parsing module 306. In such embodiments, the data parsing module 306 may be configured to parse the communication messages and determine whether any include content indicative of an upcoming task for the user to complete and/or an upcoming event for the user to attend. That is, the data parsing module 306 may be configured to detect whether particular reference phrases are included in the communication messages. For example, in some embodiments, the data parsing module 306 may be configured to detect whether any of the monitored communication messages include phrases indicative of one or more of a date, a time, an activity or an event description, a location of an activity or an event, a user's commitment to perform an activity, or any other type of content indicative of the user's plans. Additionally or alternatively, in embodiments wherein the message monitoring module 304 monitors communication messages sent to and/or received from another person (e.g., e-mail messages, chat messages, text messages, social networking posts, etc.), the data parsing module 306 may be configured to parse the communication messages to determine whether any were sent by a particular sender and/or received by a particular a recipient. The data parsing module 306 may also parse communication messages to determine the message type in some embodiments. For example, the data parsing module 306 may parse communication messages for information indicative of whether a particular message is work-related or personal (e.g., social, finance, fitness, etc.) in nature.

The task generation module 308 may be configured, in some embodiments, to generate one or more tasks using the information obtained by the data parsing module 306, or more generally, the message monitoring module 304. To do so, the task generation module 308 may process or otherwise format each of the communication messages determined to include content indicative of an upcoming task and/or event into a corresponding task. In some embodiments, the task generated by the task generation module 308 may include a description of the task and/or event and a date/time that the task is to be completed and/or the event is to occur. It should be appreciated that in other embodiments, the task generated by the task generation module 308 may include any other type of information (e.g., a location, a reminder, notes, etc.) corresponding to the upcoming task and/or event.

The remote device synchronization module 310 may be configured to synchronize one or more of the tasks and/or task lists generated by the task generation module 308 with the mobile computing device 110. To do so, the remote device synchronization module 310 may send one or more of the tasks and/or task lists generated by the task generation module 308 to the mobile computing device 110 for synchronization. Additionally or alternatively, in some embodiments, the remote device synchronization module 310 may be configured to receive one or more tasks generated by the mobile computing device 110. In such embodiments, the remote device synchronization module 310 may compare the tasks received from the mobile computing device 110 with those generated by the task generation module 308. Based on that comparison, the remote device synchronization module 310 may discard duplicate tasks received from the mobile computing device 110 (e.g., tasks that have already been generated locally by the task generation module 308). In that way, the remote device synchronization module 310 may facilitate the mobile computing device 110 in generating a comprehensive to-do list (e.g., task list) of tasks using information obtained from a variety of different sources.

Figure 4:
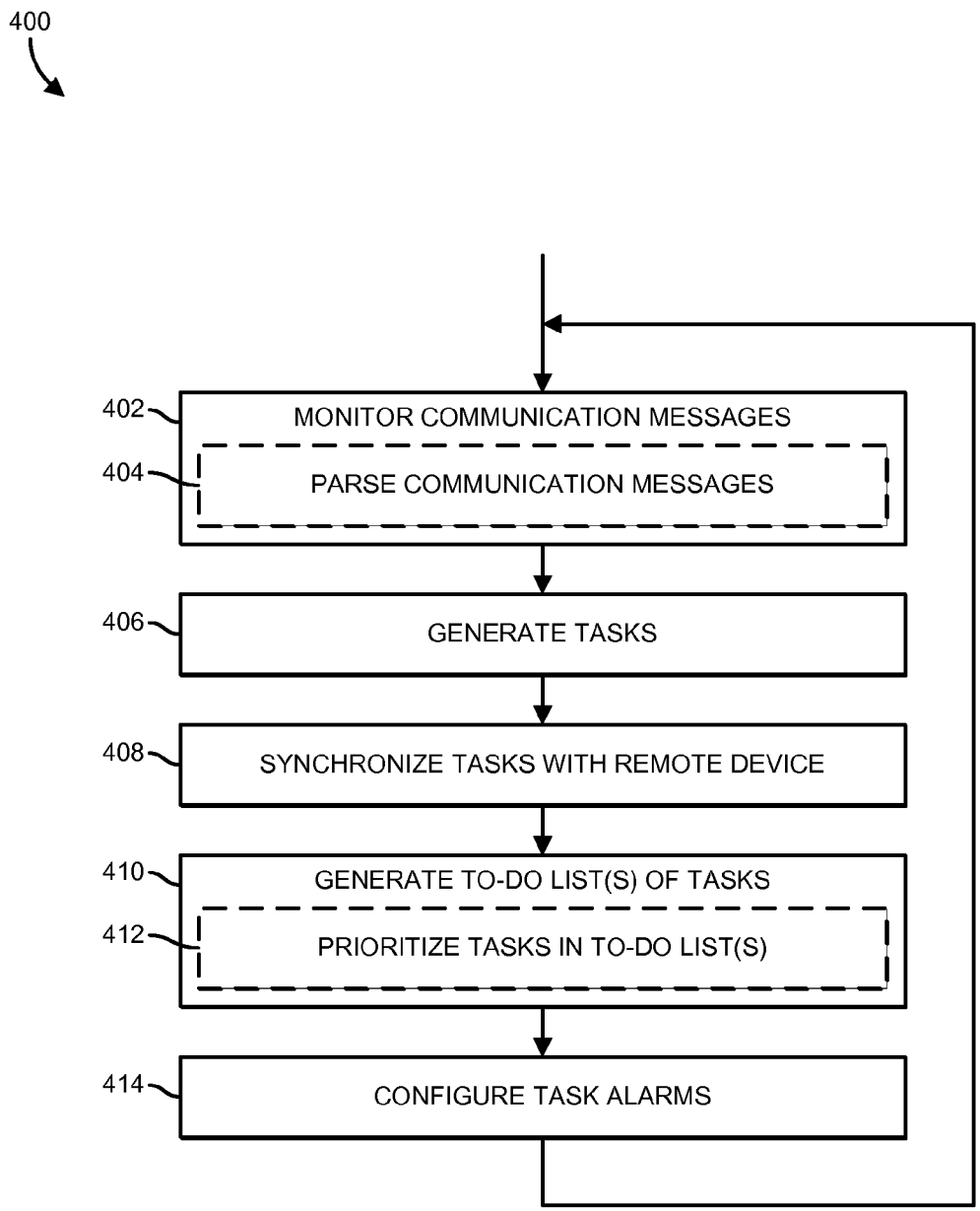
FIG. 4 is a simplified block diagram of at least one embodiment of a method for monitoring communication messages and generating tasks and to-do lists that may be executed by the mobile computing device of FIGS. 1 and 2.

Referring now to FIG. 4, in use, the mobile computing device 110 may execute a method 400 for monitoring communication messages and generating tasks and to-do lists. The method 400 begins with block 402 in which the mobile computing device 110 monitors a user's communication activities on the mobile computing device 110. For example, in some embodiments, communication messages corresponding to the user's e-mail messaging activities, device messaging activities (e.g., text messages, chats, etc.), social networking activities (e.g., comments, chats, posts, messages, etc.), device voice command activities, or any other type of communication activity on the mobile computing device 110 may be monitored. In such embodiments, the mobile computing device 110 analyzes the monitored communication messages in order to determine whether any includes content indicative of an upcoming task for the user to complete and/or an upcoming event for the user to attend.

At block 404, in some embodiments, the mobile computing device 110 parses the communication messages to facilitate analyzing the communication messages. In doing so, the mobile computing device 110 may determine whether any of the communication messages include content (e.g., particular reference phrases) indicative of an upcoming task for the user to complete and/or an upcoming event for the user to attend. Additionally or alternatively, the mobile computing device 110 may parse the communication messages to determine whether any messages were sent by a particular sender, received by a particular recipient, and/or are embodied as a communication message of a particular type (e.g., a work-related message, a personal message, a fitness-related message, a finance-related message, etc.). After the communication messages have been monitored, the method 400 advances to block 406.

At block 406, the mobile computing device 110 generates one or more tasks using the information obtained from the monitored communication messages. In some embodiments, the mobile computing device 110 processes or otherwise formats each of the communication messages determined to include content indicative of an upcoming task and/or event into a corresponding task. In some embodiments, the tasks generated by mobile computing device 110 may include one or more of a description of the tasks or events, a date/time that the tasks are to be completed or the events are to occur, a location of the tasks or events, a reminder corresponding to the tasks or events, notes corresponding to the tasks or events, and/or any other type of information corresponding to the upcoming tasks or events. After the one or more tasks have been generated using the information obtained from the monitored communication messages, the method 400 advances to block 408.

At block 408, the mobile computing device 110 synchronizes one or more tasks with the cloud server 130. In some embodiments, the tasks synchronized between the mobile computing device 110 and the cloud server 130 may include the tasks generated by the mobile computing device 110 itself. In such embodiments, the mobile computing device 110 sends one or more of the generated tasks to the cloud server 130 for synchronization. Additionally or alternatively, the tasks synchronized between the mobile computing device 110 and the cloud server 130 may include one or more tasks generated by the cloud server 130. In such embodiments, the mobile computing device 110 receives one or more tasks generated by the cloud server 130.

After the tasks have been synchronized between the mobile computing device 110 and the cloud server 130, the method 400 advances to block 410 in which the mobile computing device 110 generates a to-do list (e.g., a task list). To do so, the mobile computing device 110 arranges the generated tasks into the task list. In some embodiments, the mobile computing device 110 may prioritize, at block 412, one or more of the tasks in the task list. To do so, as discussed above, the mobile computing device 110 determines and assigns a priority for each of the generated tasks. In some embodiments, the priority for each of the tasks may be determined and assigned based at least in part on, or otherwise as a function of, the date/time that the tasks are to be completed and/or the events are to take place. Additionally or alternatively, the priority for each of the tasks may be determined and assigned based at least in part on one or more user policies, which in some embodiments, may correspond to rules relating to the prioritization of tasks that may affect the health and/or finances of the user. It should be appreciated that the mobile computing device 110 may also generate, at block 410, more than one task list, in some embodiments. For example, the mobile computing device 110 may generate a task list for work-related tasks and another task list for personal tasks.

After the one or more tasks have been arranged into one or more task lists, the method 400 advances to block 414 in which the mobile computing device 110 configures and/or generates an alarm for each task on the task list. For example, as discussed, the mobile computing device may generate an alarm (e.g., visual notification, audible notification, tactile feedback, etc.) to alert the user of the mobile computing device 110 at the start of or prior to the occurrence of a task on the task list. In some embodiments, the mobile computing device 110 determines whether to generate an alarm for each task as a function of each task's priority in the task list. Additionally or alternatively, in some embodiments, the mobile computing device 110 determines whether to generate an alarm for each task as a function of the date/time that each task is to be completed and/or each event is to occur.

Figure 5:
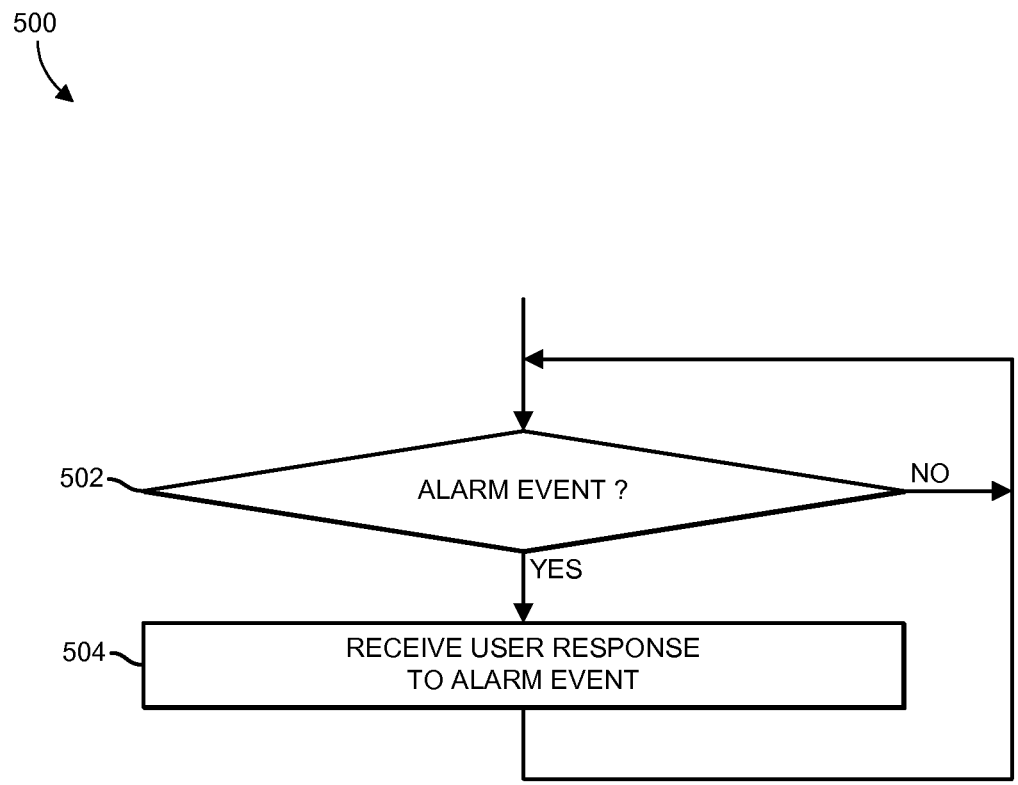
FIG. 5 is a simplified block diagram of at least one embodiment of a method for monitoring for an alarm event that may be executed by the mobile computing device of FIGS. 1 and 2.

Referring now to FIG. 5, in use, the mobile computing device 110 may execute a method 500 for monitoring for an alarm event. The method 500 begins with block 502 in which the mobile computing device 110 determines whether an alarm event has occurred. As discussed, the mobile computing device 110 may generate, in some embodiments, one or more alarms to alert the user of the mobile computing device 110 at the start of or prior to the occurrence of a task on the global task list. In such embodiments, the mobile computing device 110 may determine whether an alarm event has occurred or an alarm event is presently occurring based at least in part on processing the tasks in the global task list. If, at block 502, the mobile computing device 110 determines that an alarm event is occurring or has occurred, the method 500 advances to block 504. If, however, the mobile computing device 110 determines instead at block 502 that an alarm event is not occurring or has not occurred, then the method 500 returns to block 502.

At block 504, the mobile computing device 110 may receive the user's response to and/or interaction with the alarm. As discussed, in some embodiments, the user may be required to one or more of acknowledge, ignore, and postpone an alarm at the time of occurrence. To do so, the mobile computing device 110 may receive the user's response to and/or interaction with the alarm via one or more inputs (e.g., a touch screen, a keyboard, a mouse, a user interface, a voice recognition interface, etc.). After the user's response to and/or interaction with the alarm has been received, the method 500 returns to block 502 in which the mobile computing device 110 monitors for a new alarm event.

Figure 6:
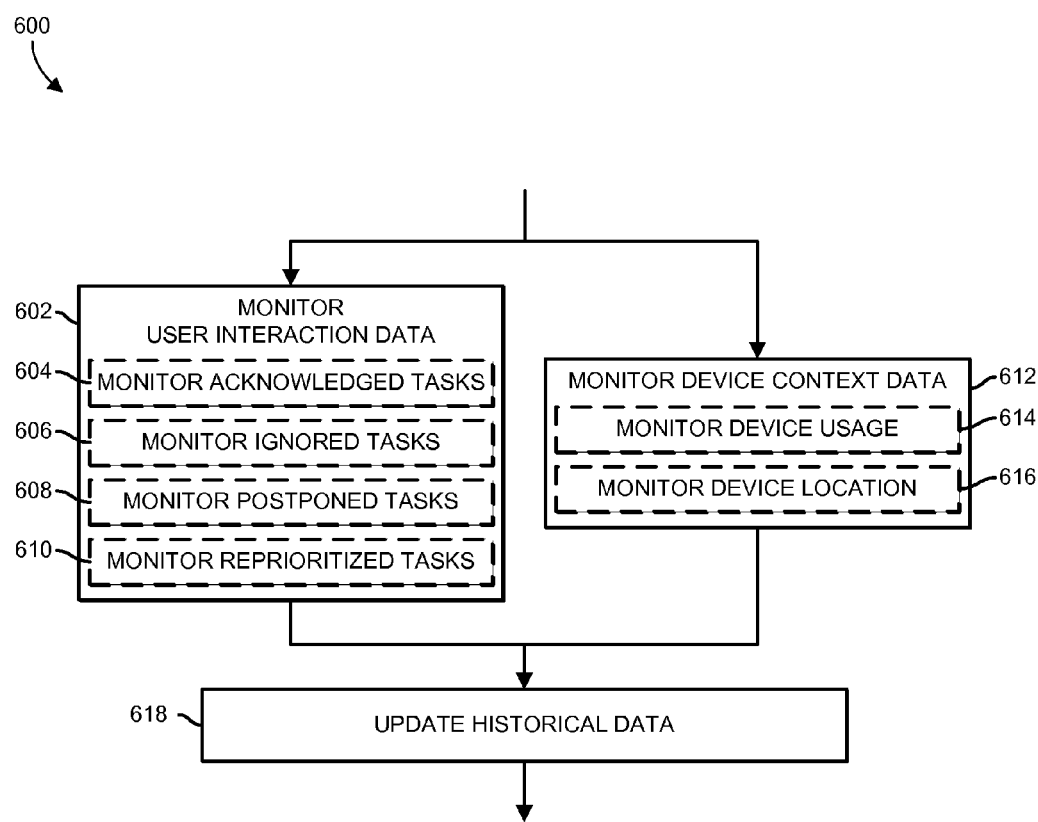
FIG. 6 is a simplified block diagram of at least one embodiment of a method for updating historical user interaction data and device context data that may be executed by the mobile computing device of FIGS. 1 and 2.

Referring now to FIG. 6, in use, the mobile computing device 110 may execute a method 600 for updating historical user interaction data and device context data. The method 600 begins with block 602 in which the mobile computing device 110 monitors user interaction data corresponding to one or more tasks and/or alarms. To do so, one or more inputs (e.g. a touch screen, a keyboard, a mouse, a user interface, a voice recognition interface, etc.) of the mobile computing device 110 are monitored to determine the user's response to one or more tasks and/or alarms. For example, at block 604, the mobile computing device 110 may determine that the user acknowledged one or more tasks and/or alarms in response to receiving input data indicative of the user acknowledging (e.g., accepting, confirming, etc.) the one or more tasks and/or alarms. At block 606, the mobile computing device 110 may also determine that the user ignored one or more tasks and/or alarms in response to receiving input data indicative of the user ignoring (e.g., user inaction, affirmative dismissal, etc.) the one or more tasks and/or alarms. At block 608, the mobile computing device 110 may also determine that the user postponed one or more tasks and/or alarms in response to receiving input data indicative of the user postponing (e.g., rescheduling, delaying, "snoozing," etc.) the one or more tasks and/or alarms. Additionally or alternatively, in some embodiments, the mobile computing device 110 may determine, at block 610, that the user reprioritized one or more tasks in response to receiving input data indicative of the user reprioritizing (e.g., changing the order) the one or more tasks in the task list.

At block 612, context data corresponding to the mobile computing device 110 is monitored. For example, at block 614, the mobile computing device 110 monitors the user's interaction with and/or usage of the mobile computing device 110, in some embodiments. The mobile computing device 110 also monitors, at block 616, the current location (e.g., work, home, school, recreational places, city, state, country, etc.) of the mobile computing device 110, in some embodiments. To do so, the mobile computing device 110 may monitor context data and/or location data (e.g., camera usage, device usage, device movement, lighting conditions, etc.) generated by one or more components of the mobile computing device 110.

In some embodiments, the mobile computing device 110 monitors the user interaction data at block 602 concurrently or otherwise at a substantially similar time to monitoring the device context data at block 612. It should be appreciated, however, that the mobile computing device 110 may also monitor the user interaction data (e.g., block 602) and the device context data (e.g., block 612) at different times. Regardless of the order in which the mobile computing device 110 monitors the user interaction data and the device context data, the method 600 advances to block 618.

As discussed, in some embodiments, the data storage 118 may store historical data 122 that is indicative of the user's past interactions with the mobile computing device 110 in different locations and/or contexts. In such embodiments, the mobile computing device 110 updates, at block 618, the historical data to include the user's current interactions with the mobile computing device 110 and the current context of the mobile computing device 110.

Figure 7:
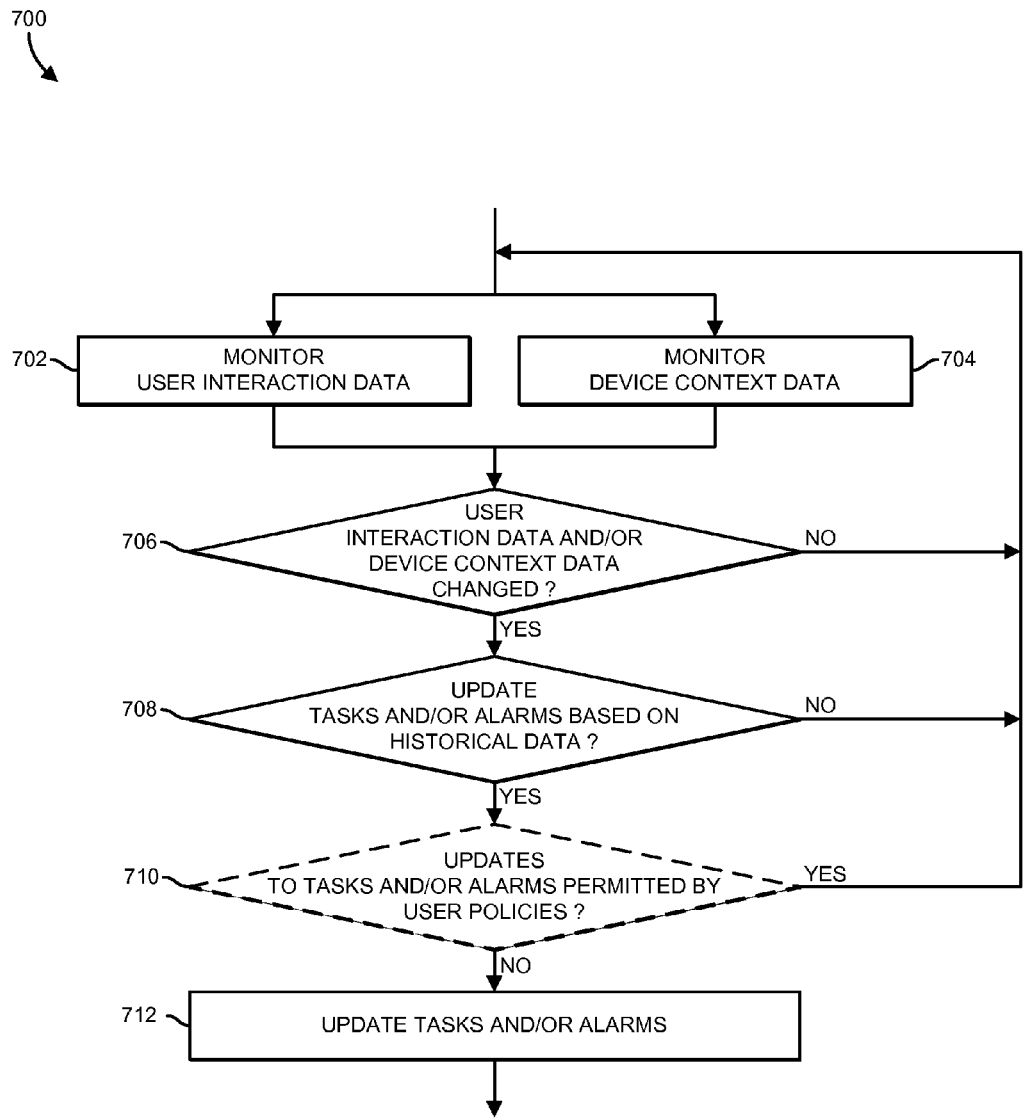
FIG. 7 is a simplified block diagram of at least one embodiment of a method for updating tasks and alarms that may be executed by the mobile computing device of FIGS. 1 and 2.

Referring now to FIG. 7, in use, the mobile computing device 110 may execute a method 700 for updating tasks and alarms in response to detecting changes to the user interaction data and/or device context data. The method 700 begins with block 702 in which the mobile computing device 110 monitors user interaction data. To do so, the mobile computing device 110 monitors one or more inputs (e.g. a touch screen, a keyboard, a mouse, a user interface, a voice recognition interface, etc.) to determine the user's response to one or more tasks and/or alarms. For example, in some embodiments, the mobile computing device 110 determines which tasks the user acknowledges, ignores, postpones, and/or reprioritizes.

At block 704, the mobile computing device 110 monitors device context data. To do so, in some embodiments, the mobile computing device 110 monitors data generated by one or more components of the mobile computing device 110 (e.g., cameras, inputs, accelerometers, global positioning system receivers, compasses, gyroscopes, ambient light sensors, proximity sensors, etc.) and determines a current context therefrom. In some embodiments, the mobile computing device 110 uses the device context data to determine a current location (e.g., work, home, school, recreational places, city, state, country, etc.) of the mobile computing device 110. It should be appreciated that blocks 702 and 704 of method 700 may be executed by the mobile computing device 110 concurrently, at a substantially similar time, or separately irrespective of the order of execution. Regardless of the order in which the mobile computing device 110 executes blocks 702 and 704, the method 700 subsequently advances to block 706.

At block 706, the mobile computing device 110 determines whether the device context data or the user interaction data has changed relative to the historical data 122. As discussed, the historical data 122 may be indicative of the user's past interactions (e.g., previous task responses) with the mobile computing device 110 in different locations and/or contexts. Therefore, to determine whether the device context data has changed relative to the historical data 122, the mobile computing device 110 may compare the current device context data with the historical data 122. For example, in some embodiments, the mobile computing device 110 may determine that the device context data has changed relative to the historical data 122 in response to determining that the current location of the mobile computing device 110 differs from the previous location of the mobile computing device 110. It should be appreciated that any type of context data may be used in determining whether the current context of the mobile computing device 110 has changed relative to a previous context of the mobile computing device 110 as embodied in the historical data 122.

As discussed, the mobile computing device also determines, at block 706, whether the user interaction data has changed relative to the historical data 122. To do so, the mobile computing device 110 compares the user's current response (e.g., acknowledge, ignore, postpone, reprioritize, etc.) to one or more tasks or alarms with the user's previous response to the same tasks or alarms and/or substantially similar tasks or alarms. For example, in some embodiments, the mobile computing device 110 may determine that the user interaction data has changed relative to the historical data 122 in response to determining that a particular task and/or alarm that was previously acknowledged by the user is now being ignored.

If, at block 706, it is determined that the current user interaction data and the current device context data have not changed relative to the historical data 122, the method 700 returns to block 702 or block 704 to continue monitoring the user interaction data and/or the device context data as discussed. If, however, it is determined instead that one or more of the current user interaction data and the current device context data have changed relative to the historical data 122, then the method 700 advances to block 708 in which the mobile computing device 110 determines whether to update one or more tasks and/or alarms based at least in part on, or otherwise as a function of, the historical data 122. In some embodiments, the mobile computing device 110 determines whether to reprioritize, reschedule (e.g., postpone), ignore, and/or cancel a particular task or alarm in response to a location change. To do so, the mobile computing device 110 analyzes the historical data 122 to determine how the user previously responded to a substantially similar task or alarm after a substantially similar location change. For example, in such embodiments, if the user previously ignored, canceled, postponed, or reprioritized a similar task or alarm because of a similar location change, the mobile computing device 110 may determine to correspondingly reprioritize, reschedule, ignore and/or cancel an upcoming task in response to the location change. Additionally or alternatively, the mobile computing device 110 determines, in some embodiments, whether to reprioritize, reschedule (e.g., postpone), ignore, and/or cancel a particular task or alarm in response to detecting changes in the user's response pattern. In that way, the mobile computing device 110 continually adjusts to the user's behavior and/or the determined location. If, at block 708, the mobile computing device 110 determines to update one or more tasks and/or alarms based at least in part on the historical data 122, the method 700 advances to block 710 or block 712. If, however, the mobile computing device 110 instead determines not to update one or more tasks and/or alarms, the method 700 returns to block 702 or block 704 to continue monitoring the user interaction data and/or the device context data as discussed.

At block 710, the mobile computing device 110 determines, in some embodiments, whether to update one or more tasks and/or alarms based at least in part on, or otherwise as a function of, one or more user policies. To do so, the mobile computing device 110 determines whether any updates to a particular task and/or an alarm are permitted according to the one or more users policies. In some embodiments, user policy data 120 may be stored in the data storage 118 as discussed. In such embodiments, the user policy data 120 may embody one or more policies and/or rules corresponding to tasks or alarms that may have health and/or financial implications for the user. For example, in some embodiments, the user policy data 120 may include rules that permit, prohibit, or otherwise limit the number and type of updates that may be made to a particular task or alarm that may affect the health or finances of the user. If, based on the user policy data 120, updates are permitted to the one or more tasks and/or alarms, the method 700 advances to block 712. If, however, based on the user policy data 120, updates are not permitted to the one or more tasks and/or alarms, the method 700 instead returns to block 702 or block 704 to continue monitoring the user interaction data and/or the device context data as discussed.

At block 712, the mobile computing device 110 updates the one or more tasks and/or alarms. To do so, the mobile computing device 110 one or more of reschedules (e.g., postpones), ignores, reprioritizes, and/or cancels the one or more tasks or alarms as determined.

Figure 8:
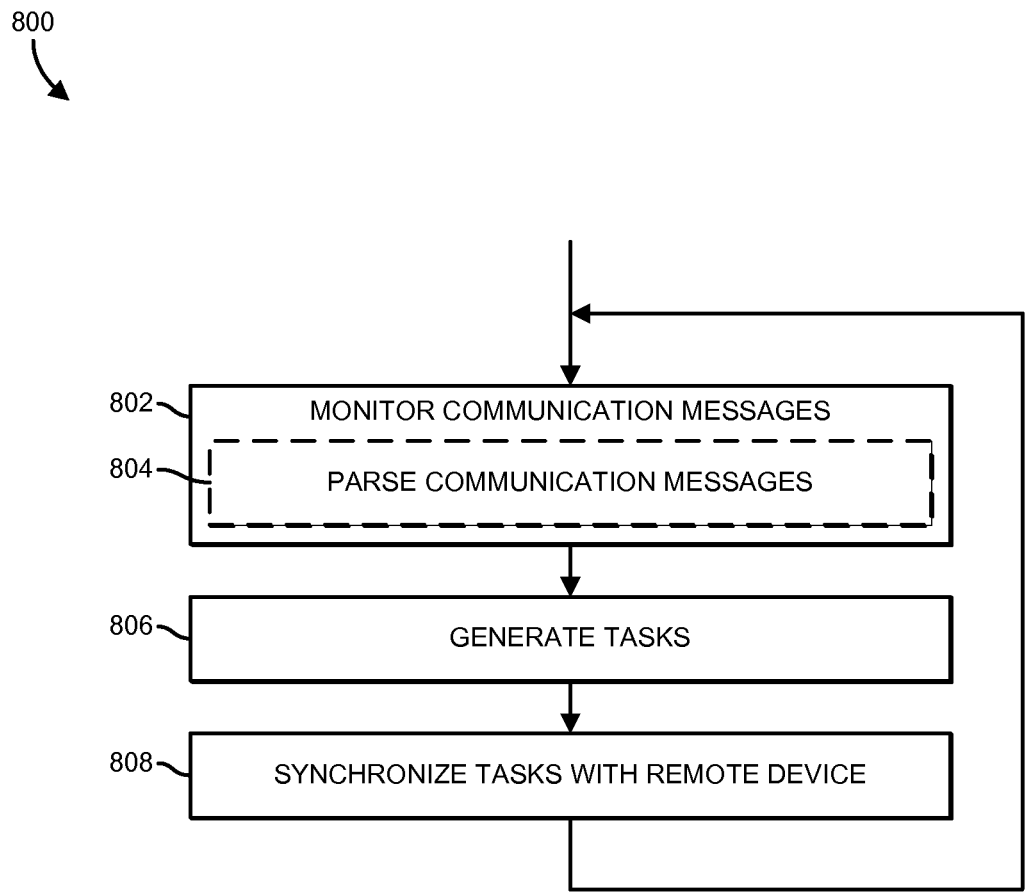
FIG. 8 is a simplified block diagram of at least one embodiment of a method for monitoring communication messages and generating tasks that may be executed by the cloud server of FIGS. 1 and 3.

Referring now to FIG. 8, in use, the cloud server 130 may execute a method 800 for monitoring communication messages and generating tasks. The method 800 begins with block 802 in which the cloud server 130 monitors a user's communication activities on the cloud server 130 and/or with one or more of the online service providers 150. For example, in some embodiments, communication messages corresponding to the user's e-mail messaging activities, device messaging activities (e.g., text messages, chats, etc.), social networking activities (e.g., comments, chats, posts, messages, etc.), device voice command activities, or any other type of communication activity on the cloud server 130 may be monitored. In such embodiments, the cloud server 130 analyzes the monitored communication messages in order to determine whether any includes content indicative of an upcoming task for the user to complete and/or an upcoming event for the user to attend.

At block 804, in some embodiments, the cloud server 130 parses the communication messages to facilitate analyzing the communication messages. In doing so, the cloud server 130 may determine whether any of the communication messages include content (e.g., particular reference phrases) indicative of an upcoming task for the user to complete and/or an upcoming event for the user to attend. Additionally or alternatively, the cloud server 130 may parse the communication messages to determine whether any were sent by a particular sender, received by a particular recipient, and/or are embodied as a communication message of a particular type (e.g., a work-related message, a personal message, a fitness-related message, a finance-related message, etc.). After the communication messages have been monitored, the method 800 advances to block 806.

At block 806, the cloud server 130 generates one or more tasks using the information obtained from the monitored communication messages. In some embodiments, the cloud server 130 processes or otherwise formats each of the communication messages determined to include content indicative of an upcoming task and/or event into a corresponding task. In some embodiments, the tasks generated by cloud server 130 may include one or more of a description of the tasks or events, a date/time that the tasks are to be completed or the events are to occur, a location of the tasks or events, a reminder corresponding to the tasks or events, notes corresponding to the tasks or events, and/or any other type of information corresponding to the upcoming tasks or events. After the one or more tasks have been generated using the information obtained from the monitored communication messages, the method 800 advances to block 808.

At block 808, the cloud server 130 synchronizes one or more tasks with the mobile computing device 110. In some embodiments, the tasks synchronized between the cloud server 130 and the mobile computing device 110 may include the tasks generated by the cloud server 130 itself. In such embodiments, the cloud server 130 sends one or more of the generated tasks to the mobile computing device 110 for synchronization. Additionally or alternatively, the tasks synchronized between the cloud server 130 and the mobile computing device 110 may include one or more tasks generated by the mobile computing device 110. In such embodiments, the cloud server 130 receives one or more tasks generated by the mobile computing device 110.

EXAMPLES

Illustrative examples of the devices, systems, and methods disclosed herein are provided below. An embodiment of the devices, systems, and methods may include any one or more, and any combination of, the examples described below.

Example 1 includes a mobile computing device for comprehensive task management. The mobile computing device includes a message monitoring module to (i) monitor communication messages on the mobile computing device, (ii) parse the communication messages, and (iii) determine whether any of the parsed communication messages include content indicative of one or more upcoming tasks to be completed; a task generation module to generate a plurality of tasks from the parsed communication messages determined to include content indicative of one or more upcoming tasks to be completed, each task corresponding to a different upcoming task; a task list generation module to generate a task list from the plurality of tasks generated by the task generation module; and a notification module to generate an alarm for each task on the task list.

Example 2 includes the subject matter of Example 1, and wherein the communication messages include at least one of an e-mail message, a text message, a chat message, a social networking post, a social networking comment, and a voice command.

Example 3 includes the subject matter of any of Examples 1 and 2, and wherein to determine whether any of the parsed communication messages include content indicative of one or more upcoming tasks to be completed includes to determine whether any of the parsed communication messages include content corresponding to at least one of a reference phrase and a reference keyword.

Example 4 includes the subject matter of any of Examples 1-3, and further including a remote device synchronization module to (i) send one or more tasks generated by the task generation module to a cloud server over a network, and (ii) receive one or more additional tasks generated by the cloud server over the network.

Example 5 includes the subject matter of any of Examples 1-4, and wherein to generate a task list from the plurality of tasks generated by the task generation module includes to generate a task list from the plurality of tasks generated by the task generation module and the one or more additional tasks received from the cloud server.

Example 6 includes the subject matter of any of Examples 1-5, and wherein the task list generation module further to (i) determine a priority for each task on the task list, and (ii) arrange each of the tasks on the task list as a function of the determined priority.

Example 7 includes the subject matter of any of Examples 1-6, and wherein to determine a priority for each task on the task list includes to determine a priority for each task on the task list as a function of user policy data, the user policy data including rules corresponding to determining the priority of tasks having one or more of health and financial implications.

Example 8 includes the subject matter of any of Examples 1-7, and further including a context monitoring module to determine a location of the mobile computing device; and wherein the task list generation module further to (i) determine that the location of the mobile computing device has changed, (ii) determine whether one or more upcoming tasks on the task list can no longer be completed because of the location change, and (iii) update an upcoming task as a function of historical data in response to determining that the upcoming task can no longer be completed because of the location change.

Example 9 includes the subject matter of any of Examples 1-8, and wherein the historical data includes historical response data and historical location data, and wherein to update an upcoming task as a function of historical data in response to determining that the upcoming task can no longer be completed because of the location change includes to one or more of cancel, reprioritize, reschedule, and ignore the upcoming task as a function of the historical data.

Example 10 includes the subject matter of any of Examples 1-9, and wherein the notification module further to one or more of disable, ignore, and modify the alarm generated for the upcoming task in response to the task list generation module one or more of canceling, reprioritizing, rescheduling, and ignoring the upcoming task as a function of the historical data.

Example 11 includes the subject matter of any of Examples 1-10, and wherein to generate an alarm for each task on the task list includes to generate a notification on the mobile computing device for alerting a user prior to occurrence of the task.

Example 12 includes the subject matter of any of Examples 1-11, and wherein the notification generated on the mobile computing device includes at least one of a visual notification, and audible notification, and tactile feedback.

Example 13 includes a method for managing tasks. The method includes monitoring, on a mobile computing device, communication messages on the mobile computing device; parsing, on the mobile computing device, the communication messages; determining, on the mobile computing device, whether any of the parsed communication messages include content indicative of one or more upcoming tasks to be completed; generating, on the mobile computing device, a plurality of tasks from the parsed communication messages determined to include content indicative of one or more upcoming tasks to be completed, each task corresponding to a different upcoming task; generating, on the mobile computing device, a task list from the plurality of tasks generated; and generating, on the mobile computing device, an alarm for each task on the task list.

Example 14 includes the subject matter of Example 13, and wherein the communication messages include at least one of an e-mail message, a text message, a chat message, a social networking post, a social networking comment, and a voice command.

Example 15 includes the subject matter of any of Examples 13 and 14, and wherein determining whether any of the parsed communication messages include content indicative of one or more upcoming tasks to be completed includes determining whether any of the parsed communication messages include content corresponding to at least one of a reference phrase and a reference keyword.

Example 16 includes the subject matter of any of Examples 13-15, and further including sending one or more of the tasks generated on the mobile computing device to a cloud server over a network; and receiving, on the mobile computing device, one or more additional tasks from the cloud server over the network, the one or more additional tasks being generated by the cloud server.

Example 17 includes the subject matter of any of Examples 13-16, and wherein generating a task list from the plurality of generated tasks includes generating a task list from the plurality of tasks generated on the mobile computing device and the one or more additional tasks received from the cloud server.

Example 18 includes the subject matter of any of Examples 13-17, and further including determining, on the mobile computing device, a priority for each task on the task list; and arranging, on the mobile computing device, each of the tasks on the task list as a function of the determined priority.

Example 19 includes the subject matter of any of Examples 13-18, and wherein determining a priority for each task on the task list includes determining a priority for each task on the task list as a function of user policy data, the user policy data including rules corresponding to determining the priority of tasks having one or more of health and financial implications.

Example 20 includes the subject matter of any of Examples 13-19, and further including determining, on the mobile computing device, a location of the mobile computing device; determining, on the mobile computing device, that the location of the mobile computing device has changed; determining, on the mobile computing device, whether one or more upcoming tasks on the task list can no longer be completed because of the location change; and updating, on the mobile computing device, an upcoming task as a function of historical data in response to determining that the upcoming task can no longer be completed because of the location change.

Example 21 includes the subject matter of any of Examples 13-20, and wherein the historical data includes historical response data and historical location data, and wherein updating an upcoming task as a function of historical data in response to determining that the upcoming task can no longer be completed because of the location change includes one or more of canceling, reprioritizing, rescheduling, and ignoring the upcoming task as a function of the historical data.

Example 22 includes the subject matter of any of Examples 13-21, and further including one or more of disabling, ignoring, and modifying the alarm generated for the upcoming task in response to one or more of canceling, reprioritizing, rescheduling, and ignoring the upcoming task as a function of the historical data.

Example 23 includes the subject matter of any of Examples 13-22, and wherein generating an alarm for each task on the task list includes generating a notification on the mobile computing device to alert a user prior to occurrence of the task.

Example 24 includes the subject matter of any of Examples 13-23, and wherein the notification generated on the mobile computing device includes at least one of a visual notification, and audible notification, and tactile feedback.

Example 25 includes a mobile computing device for comprehensive task management, the mobile computing device including a processor; and a memory having stored therein a plurality of instructions that when executed by the processor cause the mobile computing device to perform the method of any of Examples 13-24.

Example 26 include one or more machine readable media including a plurality of instructions stored thereon that in response to being executed result in a mobile computing device performing the method of any of Examples 13-24.

Example 27 includes a cloud server for comprehensive task management. The cloud server includes a message monitoring module to (i) monitor online communication messages, (ii) parse the online communication messages, and (iii) determine whether any of the parsed online communication messages include content indicative of one or more upcoming tasks to be completed; a task generation module to generate a plurality of tasks from the parsed online communication messages determined to include content indicative of one or more upcoming tasks to be completed, each task corresponding to a different upcoming task; and a remote device synchronization module to (i) send one or more tasks generated by the task generation module to a mobile computing device over a network, and (ii) receive one or more additional tasks generated by the mobile computing device over the network.

Example 28 includes the subject matter of Example 27, and wherein the online communication messages include at least one of an e-mail message, a text message, a chat message, a social networking post, a social networking comment, and a voice command.

Example 29 includes the subject matter of any of Examples 27 and 28, and wherein to determine whether any of the parsed online communication messages include content indicative of one or more upcoming tasks to be completed includes to determine whether any of the parsed online communication messages include content corresponding to at least one of a reference phrase and a reference keyword.

Example 30 includes a method for managing tasks. The method includes monitoring, on a cloud server, online communication messages; parsing, on the cloud server, the online communication messages; determining, on the cloud server, whether any of the parsed online communication messages include content indicative of one or more upcoming tasks to be completed; generating, on the cloud server, a plurality of tasks from the parsed online communication messages determined to include content indicative of one or more upcoming tasks to be completed, each task corresponding to a different upcoming task; sending, on the cloud server, one or more of the tasks generated by the cloud server to a mobile computing device over a network; and receiving, on the cloud server, one or more additional tasks from the mobile computing device over the network, the one or more additional tasks being generated by the mobile computing device.

Example 31 includes the subject matter of Example 30, and wherein the online communication messages include at least one of an e-mail message, a text message, a chat message, a social networking post, a social networking comment, and a voice command.

Example 32 includes the subject matter of any of Examples 30 and 31, and wherein determining whether any of the parsed online communication messages include content indicative of one or more upcoming tasks to be completed includes determining whether any of the parsed online communication messages include content corresponding to at least one of a reference phrase and a reference keyword.

Example 33 includes a cloud server for managing tasks. The cloud server includes a processor; and a memory having stored therein a plurality of instructions that when executed by the processor cause the cloud server to perform the method of any of Examples 30-32.

Example 34 includes one or more machine readable media including a plurality of instructions stored thereon that in response to being executed result in a cloud server performing the method of any of Examples 30-32.

The invention claimed is:

1. A mobile computing device for comprehensive task management, the mobile computing device comprising:
 a context monitoring module to determine a location of the mobile computing device different from a previous location;
 a message monitoring module to (i) monitor communication messages on the mobile computing device, (ii) parse the communication messages, and (iii) determine whether any of the parsed communication messages comprise content indicative of one or more upcoming tasks to be completed;
 a task generation module to, without direction from a user of the mobile computing device, generate a plurality of tasks from the parsed communication messages determined to comprise content indicative of one or more upcoming tasks to be completed, each task corresponding to a different upcoming task;
 a task list generation module to (i) without direction from the user and in response to the determination by the message monitoring module that at least one parsed communication message comprises content indicative of one or more upcoming tasks to be completed, generate a task list from the plurality of tasks generated by the task generation module, (ii) determine that the location of the mobile computing device has changed from the previous location, (iii) determine whether one or more upcoming tasks on the task list can no longer be completed because the one or more upcoming tasks were scheduled to be completed in the previous location, (iv) update an upcoming task as a function of historical data in response to a determination that the upcoming task can no longer be completed because the upcoming task was scheduled to be completed in the previous location; and
 a notification module to, without direction from the user and in response to the determination by the message monitoring module that at least one parsed communication message comprises content indicative of one or more upcoming tasks to be completed, generate an alarm for each task on the task list.

2. The mobile computing device of claim 1, wherein the communication messages comprise at least one of an e-mail message, a text message, a chat message, a social networking post, a social networking comment, and a voice command.

3. The mobile computing device of claim 1, wherein to determine whether any of the parsed communication messages comprise content indicative of one or more upcoming tasks to be completed comprises to determine whether any of the parsed communication messages comprise content corresponding to at least one of a reference phrase and a reference keyword.

4. The mobile computing device of claim 1, further comprising a remote device synchronization module to (i) send one or more tasks generated by the task generation module to a cloud server over a network, and (ii) receive one or more additional tasks generated by the cloud server over the network.

5. The mobile computing device of claim 4, wherein to generate a task list from the plurality of tasks generated by the task generation module comprises to generate a task list from the plurality of tasks generated by the task generation module and the one or more additional tasks received from the cloud server.

6. The mobile computing device of claim 5, wherein the task list generation module further to (i) determine a priority for each task on the task list, and (ii) arrange each of the tasks on the task list as a function of the determined priority.

7. The mobile computing device of claim 6, wherein to determine a priority for each task on the task list comprises to determine a priority for each task on the task list as a function of user policy data, the user policy data comprising rules corresponding to determining the priority of tasks having one or more of health and financial implications.

8. The mobile computing device of claim 1, wherein the historical data comprises historical response data and historical location data, and
 wherein to update an upcoming task as a function of historical data in response to determining that the upcoming task can no longer be completed because of the location change comprises to one or more of cancel, reprioritize, reschedule, or ignore the upcoming task as a function of the historical data.

9. The mobile computing device of claim 8, wherein the notification module further to one or more of disable, ignore, or modify the alarm generated for the upcoming task in response to the one or more of cancel, reprioritize, reschedule, or ignore of the upcoming task as a function of the historical data.

10. The mobile computing device of claim 1, wherein to generate an alarm for each task on the task list comprises to generate a notification on the mobile computing device for alerting a user prior to occurrence of the task.

11. The mobile computing device of claim 10, wherein the notification generated on the mobile computing device comprises at least one of a visual notification, and audible notification, and tactile feedback.

12. The mobile computing device of claim 1, wherein to update an upcoming task as a function of historical data comprises to update an upcoming task as a function of historical response data.

13. The mobile computing device of claim 12, wherein the historical response data comprises a previous response from the user ignoring, canceling, postponing, or reprioritizing a previous task in response to a location change, and
   wherein to update an upcoming task as a function of historical response data comprises to update an upcoming task based on the previous response of the user.

14. A method for managing tasks, the method comprising:
   determining, on the mobile computing device, a location of the mobile computing device different from a previous location;
   monitoring, on a mobile computing device, communication messages on the mobile computing device;
   parsing, on the mobile computing device, the communication messages;
   determining, on the mobile computing device, whether any of the parsed communication messages comprise content indicative of one or more upcoming tasks to be completed;
   generating, on the mobile computing device without direction from a user of the mobile computing device, a plurality of tasks from the parsed communication messages determined to comprise content indicative of one or more upcoming tasks to be completed, each task corresponding to a different upcoming task;
   generating, on the mobile computing device, without direction from the user, and in response to the determination that at least one parsed communication message comprises content indicative of one or more upcoming tasks to be completed, a task list from the plurality of tasks generated;
   determining, on the mobile computing device, that the location of the mobile computing device has changed from the previous location;
   determining, on the mobile computing device, whether one or more upcoming tasks on the task list can no longer be completed because the one or more upcoming tasks were scheduled to be completed in the previous location;
   updating, on the mobile computing device, an upcoming task as a function of historical data in response to determining that the upcoming task can no longer be completed because the upcoming task was scheduled to be completed in the previous location; and
   generating, on the mobile computing device, without direction from the user, and in response to the determination that at least one parsed communication message comprises content indicative of one or more upcoming tasks to be completed, an alarm for each task on the task list.

15. The method of claim 14, wherein determining whether any of the parsed communication messages comprise content indicative of one or more upcoming tasks to be completed comprises determining whether any of the parsed communication messages comprise content corresponding to at least one of a reference phrase and a reference keyword.

16. The method of claim 14, further comprising:
   sending one or more of the tasks generated on the mobile computing device to a cloud server over a network; and
   receiving, on the mobile computing device, one or more additional tasks from the cloud server over the network, the one or more additional tasks being generated by the cloud server.

17. The method of claim 16, further comprising:
   determining, on the mobile computing device, a priority for each task on the task list;
   arranging, on the mobile computing device, each of the tasks on the task list as a function of the determined priority; and
   wherein generating a task list from the plurality of generated tasks comprises generating a task list from the plurality of tasks generated on the mobile computing device and the one or more additional tasks received from the cloud server.

18. The method of claim 14, wherein the historical data comprises historical response data and historical location data, and
   wherein updating an upcoming task as a function of historical data in response to determining that the upcoming task can no longer be completed because the upcoming task was scheduled to be completed in the previous location comprises one or more of canceling, reprioritizing, rescheduling, and ignoring the upcoming task as a function of the historical data.

19. The method of claim 18, further comprising one or more of disabling, ignoring, and modifying the alarm generated for the upcoming task in response to one or more of canceling, reprioritizing, rescheduling, and ignoring the upcoming task as a function of the historical data.

20. The method of claim 14, wherein updating an upcoming task as a function of historical data comprises updating an upcoming task as a function of historical response data.

21. The method of claim 20, wherein the historical response data comprises a previous response from the user ignoring, canceling, postponing, or reprioritizing a previous task in response to a location change, and
   wherein updating an upcoming task as a function of historical response data comprises updating an upcoming task based on the previous response of the user.

22. One or more non-transitory, machine readable media comprising a plurality of instructions stored thereon that, in response to execution, cause a mobile computing device to:
   determine a location of the mobile computing device different from a previous location;
   monitor communication messages on the mobile computing device;
   parse the communication messages;
   determine whether any of the parsed communication messages comprise content indicative of one or more upcoming tasks to be completed;
   generate, without direction from a user of the mobile computing device, a plurality of tasks from the parsed communication messages determined to comprise content indicative of one or more upcoming tasks to be completed, each task corresponding to a different upcoming task;

generate, without direction from the user and in response to the determination that at least one parsed communication message comprises content indicative of one or more upcoming tasks to be completed, a task list from the plurality of tasks generated;

determine that the location of the mobile computing device has changed from the previous location;

determine whether one or more upcoming tasks on the task list can no longer be completed because the one or more upcoming tasks were scheduled to be completed in the previous location; and update an upcoming task as a function of historical data in response to a determination that the upcoming task can no longer be completed because the upcoming task was scheduled to be completed in the previous location; and generate, without direction from the user and in response to the determination by the message monitoring module that at least one parsed communication message comprises content indicative of one or more upcoming tasks to be completed, an alarm for each task on the task list.

23. The one or more non-transitory, machine readable media of claim 22, wherein to determine whether any of the parsed communication messages comprise content indicative of one or more upcoming tasks to be completed comprises to determine whether any of the parsed communication messages comprise content corresponding to at least one of a reference phrase and a reference keyword.

24. The one or more non-transitory, machine readable media of claim 22, wherein the plurality of instructions further cause the mobile computing device to:
send one or more of the tasks generated on the mobile computing device to a cloud server over a network; and
receive one or more additional tasks from the cloud server over the network, the one or more additional tasks being generated by the cloud server.

25. The one or more non-transitory, machine readable media of claim 24, wherein the plurality of instructions further cause in the mobile computing device to:
determine a priority for each task on the task list;
arrange each of the tasks on the task list as a function of the determined priority; and
wherein to generate a task list from the plurality of generated tasks comprises to generate a task list from the plurality of tasks generated on the mobile computing device and the one or more additional tasks received from the cloud server.

26. The one or more non-transitory, machine readable media of claim 22, wherein the historical data comprises historical response data and historical location data, and
wherein to update an upcoming task as a function of historical data in response to a determination that the upcoming task can no longer be completed because of the location change comprises to one or more of cancel, reprioritize, reschedule, or ignore the upcoming task as a function of the historical data.

27. The one or more non-transitory, machine readable media of claim 26, wherein the plurality of instructions further cause the mobile computing device to disable, ignore, or modify the alarm generated for the upcoming task in response to the one or more of cancel, reprioritize, reschedule, or ignore of the upcoming task as a function of the historical data.

28. The one or more non-transitory, machine readable media of claim 22, wherein to update an upcoming task as a function of historical data comprises to update an upcoming task as a function of historical response data.

29. The one or more non-transitory, machine readable media of claim 28, wherein the historical response data comprises a previous response from the user ignoring, canceling, postponing, or reprioritizing a previous task in response to a location change, and
wherein to update an upcoming task as a function of historical response data comprises to update an upcoming task based on the previous response of the user.

* * * * *

UNITED STATES PATENT AND TRADEMARK OFFICE
CERTIFICATE OF CORRECTION

PATENT NO. : 9,514,448 B2
APPLICATION NO. : 13/729595
DATED : December 6, 2016
INVENTOR(S) : Gyan Prakash et al.

It is certified that error appears in the above-identified patent and that said Letters Patent is hereby corrected as shown below:

On the Title Page

The inventor "Nagasubramanian Gurumoorthly" should read --Nagasubramanian Gurumoorthy--.

Signed and Sealed this
Second Day of May, 2017

Michelle K. Lee
*Director of the United States Patent and Trademark Office*